United States Patent
Yoshida et al.

(10) Patent No.: US 8,702,183 B2
(45) Date of Patent: Apr. 22, 2014

(54) RUNNING DEVICE FOR TRACK-LAYING VEHICLE

(75) Inventors: Tsuyoshi Yoshida, Hirakata (JP); Shinji Mitsuta, Hiratsuka (JP); Shinya Nakamura, Hiratsuka (JP); Souichi Tsumura, Hirakata (JP); Tetsunori Yamashita, Hirakata (JP)

(73) Assignee: Komatsu Ltd., Tokyo (JP)

( * ) Notice: Subject to any disclaimer, the term of this patent is extended or adjusted under 35 U.S.C. 154(b) by 437 days.

(21) Appl. No.: 12/714,269

(22) Filed: Feb. 26, 2010

(65) Prior Publication Data

US 2010/0244554 A1 Sep. 30, 2010

(30) Foreign Application Priority Data

Feb. 27, 2009 (JP) ................................. 2009-045435

(51) Int. Cl.
 *B62D 55/14* (2006.01)
(52) U.S. Cl.
 USPC .......................................... 305/132; 305/138
(58) Field of Classification Search
 USPC ................. 305/124–125, 127–134, 136, 138, 305/141–142
 See application file for complete search history.

(56) References Cited

U.S. PATENT DOCUMENTS

| | | | | |
|---|---|---|---|---|
| 3,826,325 A | * | 7/1974 | Purcell et al. | 180/9.54 |
| 4,097,093 A | * | 6/1978 | Shelby et al. | 305/125 |
| 4,373,758 A | * | 2/1983 | Livesay | 305/125 |
| 4,553,790 A | * | 11/1985 | Boggs | 305/132 |
| 4,681,177 A | * | 7/1987 | Zborowski | 180/9.56 |
| 5,873,640 A | * | 2/1999 | Oertley | 305/138 |
| 6,607,256 B2 | * | 8/2003 | Yoshida et al. | 305/132 |
| 7,014,278 B2 | * | 3/2006 | Yoshida et al. | 305/132 |
| 7,862,131 B2 | * | 1/2011 | Poirier | 305/134 |

FOREIGN PATENT DOCUMENTS

| | | |
|---|---|---|
| JP | 2001-225770 | 8/2001 |
| JP | 2005-225485 | 8/2005 |

* cited by examiner

*Primary Examiner* — Jason Bellinger
(74) *Attorney, Agent, or Firm* — Fish & Richardson P.C.

(57) ABSTRACT

There is provided a running device for track-laying vehicle, which can resolve a feeling of fear of falling height in a leading end portion of a crawler while relax a large impact when the crawler runs over a raised contact area. The running device includes a spring constant equalizing unit that equalizes an apparent spring constant of a second arm of lower track roller bogie device over a total length. The apparent spring constant is generated in maximum reverse camber of the crawler. The spring constant equalizing unit increases an oscillation angle α of the second arm that can abut on the first arm in the maximum reverse camber of the crawler such that the oscillation angle α of the second arm is larger than a crossing angle β of the connecting link. Desirably the increased maximum oscillation angle of the second arm is 1.3-2.0 times the crossing angle β.

5 Claims, 11 Drawing Sheets

OSCILLATION ANGLE OF 8°

PRIOR ART

FIG. 10C

OSCILLATION ANGLE OF 13°

FIG. 11

RUNNING DEVICE FOR TRACK-LAYING VEHICLE

BACKGROUND OF THE INVENTION

1. Field of the Invention

The present invention relates to a running device for a track-laying vehicle in which a falling height of a nose is reduced while a local impact is relaxed when a crawler crosses over a projected running surface.

2. Description of Related Art

Figure 9:
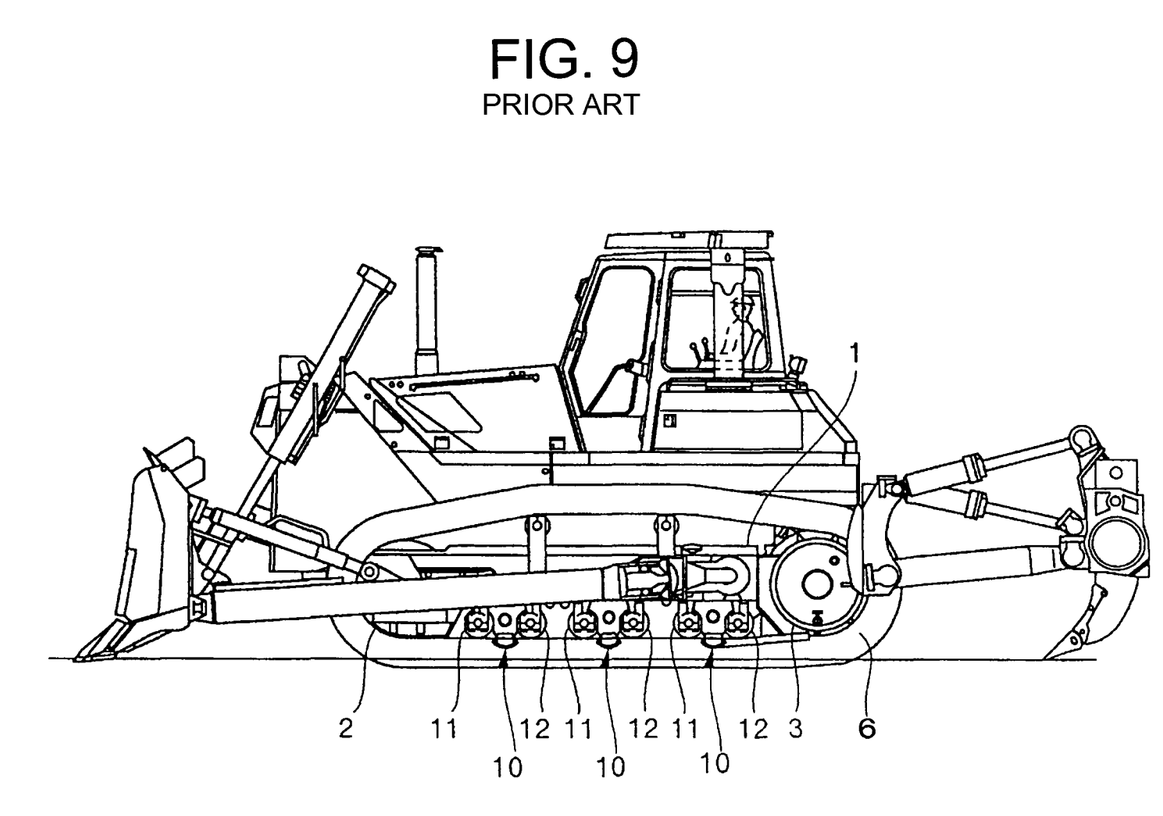
FIG. 9 is a side view of a bulldozer that is of a typical type of the track-laying vehicle.

Conventionally, sometimes a bogie type (oscillation type) lower track roller, particularly a double-bogie type lower track roller is mounted on the widely used running device for the track-laying vehicle in order to improve ride quality during running. FIG. 9 illustrates a bulldozer that is of an example of the track-laying vehicle. The track-laying vehicle includes a pair of running devices in right and left lower portions of a vehicle body, and the running device includes a crawler 6. A track frame 1, an idler 2, a sprocket 3, and double-bogie devices 10 are provided in the running device. The track frame 1 is provided along a front-back direction of the vehicle. The idler 2 and the sprocket 3 are provided in front-back end portions, respectively. The double-bogie device 10 includes a plurality of lower track rollers 11 and 12 rotatably supported in a lower portion of the track frame 1 and supported in the front-back direction of the vehicle body while freely oscillated.

For example, in a running device of a track-laying vehicle disclosed in Japanese Patent Application Laid-Open No. 2001-225770, a predetermined tension is applied outward in a yoke while a spring is interposed therebetween, and the yoke is mounted on a front end portion of a track frame while being movable in a longitudinal direction (front-back direction of vehicle). An idler is rotatably attached to a leading end portion of the yoke. A sprocket is attached to a vehicle body provided close to a rear and of the track frame, and a bogie type lower track roller unit is provided between the idler and the sprocket while being able to be oscillated. In the running device disclosed in JP-A No. 2001-225770, the bogie device provided close to the idler is a single-bogie device that supports one lower track roller while being freely oscillated. A plurality of sets of double-bogie devices are provided in the track frame between the sprocket and the single-bogie device. A crawler is entrained about the idler, the sprocket, and the plurality of lower track rollers.

Figure 1:
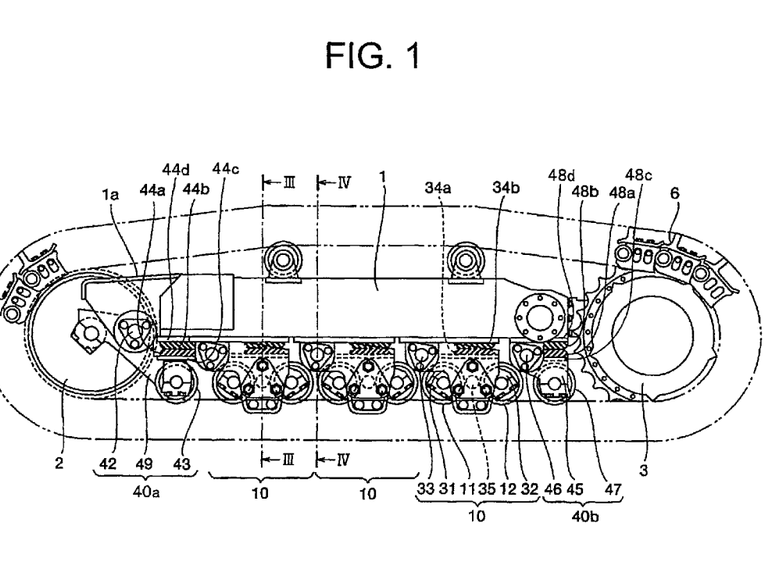
FIG. 1 is an entire side view illustrating a running device for track-laying vehicle according to a preferred embodiment of the invention.

For example, as illustrated in FIG. 1, JP-A No. 2005-225485 discloses a running device for track-laying vehicle including a single-bogie device 40a. In the single-bogie device 40a, the center of a leading-end-portion arm 49 is turnably supported by a pin 42 attached to a front end portion of the track frame 1, the idler 2 is rotatably supported in a front end portion of the leading-end-portion arm 49, and a leading-end-portion lower track roller 43 is rotatably supported in a rear end portion of the leading-end-portion arm 49. A so-called single-bogie device 40b is provided in a rear end portion of the track frame 1. In the single-bogie device 40b, a front end portion of a rear-end-portion arm 45 is attached while being able to be oscillated, and a rear-end-portion lower track roller 47 is rotatably attached to a rear end portion of the rear-end-portion arm 45. The plurality of sets of double-bogie devices 10 are provided in the lower portion of the track frame 1 between the front single-bogie device and the back single-bogie device. The entire structures of the running device and double-bogie device are visually similar to those of an embodiment of the invention. Therefore, for the sake of convenience, the numerals in the corresponding portions of the conventional running device and double-bogie device are designated in principle by the same numerals as the embodiment of the invention.

Figure 2:
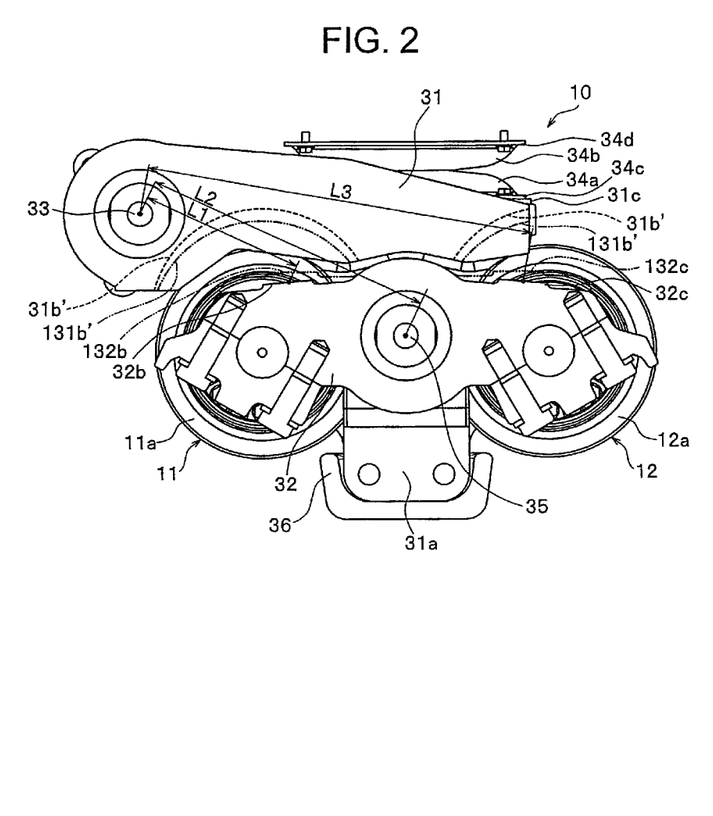
FIG. 2 is a side view of a double-bogie device mounted on the running device.

As illustrated by a solid line and a phantom line (alternate long and two short dashes line) of FIG. 2, in the conventional double-bogie device 10, while freely oscillated, a base end portion of a first arm 31 is supported in the lower portion of the track frame 1 with a first pin 33 as a first turning fulcrum. While freely oscillated, a substantially central portion of a second arm 32 is supported in the leading end portion of the first arm 31 with a second pin 35 as a second turning fulcrum. First and second lower track rollers 11 and 12 are rotatably attached to front-back end portions of the second arm 32, respectively. At this point, the first pin 33 is provided in a position closer to the idler 2 than the second pin 35. Elastic members 34a and 34b are fixed in an abutment portion between a leading-end upper portion of the first arm 31 and the lower portion of the track frame 1. The abutment of the elastic members 34a and 34b restricts the upward turning of the first arm 31 while absorbing impacts of the first and second lower track roller 11 and 12 when the running device runs on or runs over the raised portion. An apparent spring constant of the bogie device is derived from the elastic members 34a and 34b.

When the crawler 6 runs on a flat ground, the first and second lower track rollers 11 and 12 are located in a horizontal position, and the both the lower track rollers 11 and 12 come equally into contact with a wheel tread of a connecting link 62 connected to the crawler 6. Therefore, a position of a load applied onto the pair of front-back first and second lower track rollers 11 and 12 of the double-bogie device 10 becomes the center of the first arm 31, which is of the central support portion between the first and second lower track rollers 11 and 12. The bogie device 10 is subjected to the vehicle body load in the first-arm central position (second turning fulcrum). On the other hand, when the crawler 6 runs on the raised portion, the pair of front-back first and second lower track rollers 11 and 12 of the double-bogie device 10 is turned clockwise or counterclockwise by the inclination of the crawler 6 while the second arm 32 is interposed therebetween. Stopper portions 32b and 32c raised from upper surfaces of front-back arm portions which sandwich the turning fulcrum (second turning fulcrum) of the second arm 32 therebetween abut on a lower surface of the first arm 31, and the abutment surface is subjected to the vehicle body load. At this point, the impact is relaxed by elastic forces of the elastic members 34a and 34b that are fixed to portions opposite the lower surface of the track frame 1 and the upper surface of the first arm 31.

Figure 10A:
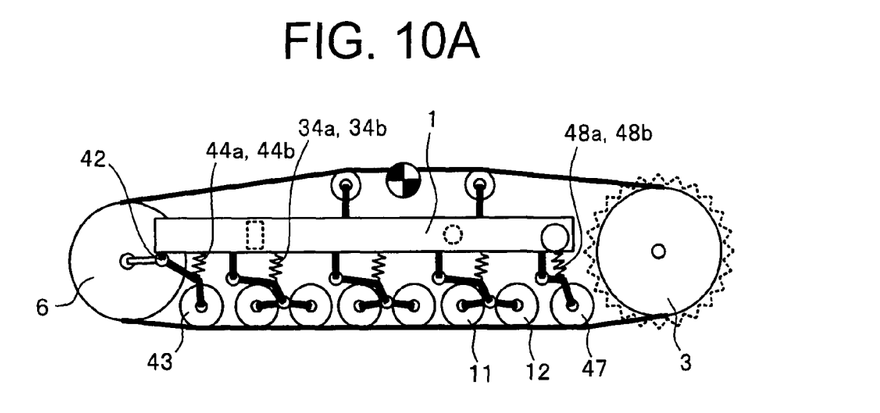
FIGS. 10A, 10B and 10C are explanatory views illustrating a apparent spring constant distribution in a length direction of a track frame in a running device.
Figure 10B:
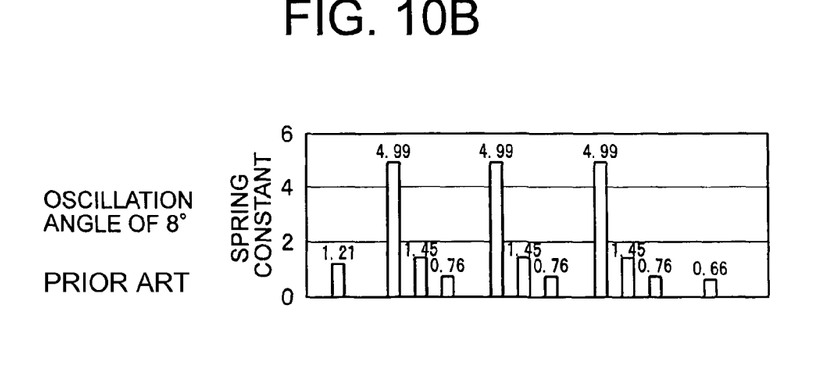
Figure 10C:
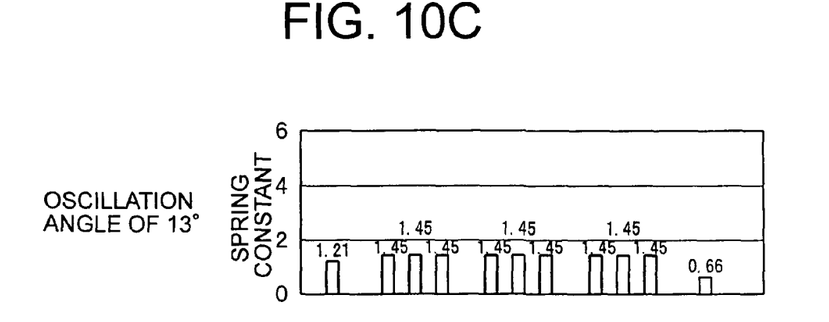

Thus, a position of the load applied between the pair of front-back first and second lower track rollers 11 and 12 of the double-bogie device 10 varies according to the shape of the actual contact area. For example, the position of the load applied between the pair of front-back first and second lower track rollers 11 and 12 becomes the central fulcrum between the first and second lower track rollers 11 and 12 when the crawler 6 runs on the flat surface, and the position becomes one of the front-back stopper abutment surfaces of the second arm 32 when the crawler 6 runs on the raised portion. At this point, as schematically illustrated in FIGS. 2, 10A, and 10B, the apparent spring constant of the double-bogie device 10 depends on a distance L2 from the oscillation fulcrum of the first arm 31 to the central fulcrum (second turning fulcrum) between the first and second lower track rollers 11 and 12 and distances L1 and L3 (L1<L3) from the oscillation fulcrum of the first arm 31 to abutment surfaces between the oscillation fulcrum of the first arm 31 and front-back stopper portions 32b and 32c of the second arm 32. For example, when the abutment surface of the front-portion stopper portion 32b of the second arm 32 closest to the oscillation fulcrum of the first arm 31 is subjected to the vehicle body load, a distance between the first turning fulcrum and the abutment portion of the elastic bodies 34a and 34b, which is of an action point, is kept constant to minimize a distance between the power point and the first turning fulcrum. Therefore, the spring constant is maximized. FIG. 10B illustrates a distribution of the apparent spring constant in position (power point) subjected to each load. That is, in the distribution of the apparent spring constant of the double-bogie device 10, the apparent spring constant is gradually decreased in the order of the front-portion stopper abutting position of the second arm 32 on the oscillation fulcrum side (idler side) of the first arm 31 of the double-bogie device 10, the oscillation fulcrum of the second arm 32, and the rear-portion stopper abutting position of the second arm on the sprocket side farthest from the oscillation fulcrum of the first arm 31. In FIGS. 10B and 10C, a horizontal axis corresponds to the crawler of FIG. 10A in terms of position.

In the running device of the conventional track-laying vehicle, when the track-laying vehicle runs on the raised portion, the position supporting the vehicle body load is a position in which the elastic members 44a and 44b are placed in the single-bogie device 40a or 40b, and the position supporting the vehicle body load is substantially matched with the position of the leading-end-portion lower track roller 43 like the flat contact area. On the other hand, in the double-bogie device 10, part of the crawler 6 becomes a reverse camber state so as to wrap the raised contact area in the front-back direction. As illustrated with arrows in FIG. 11, in the second arms 32 and 32 of two sets of double-bogie devices 10 and 10 that are adjacent in the front-back direction with the raised contact area sandwiched therebetween, a front side (left of FIG. 11) in the running direction is rotated counterclockwise about a first arm support point, and a rear side (right of FIG. 11) in the running direction is rotated clockwise about the first arm support point. When the oscillation angle (rotation angle of second arm) α reaches a predetermined angle, an abutment surface of the stopper portion 32b, which is of an upper raised surface formed in the arm portion upper surface of the second lower track roller (right of FIG. 11) 12 of the second arm 32 on the front side in the running direction, comes into contact with the lower surface of the first arm 31 to control the further oscillation. At this point, it is assumed that a maximum oscillation angle is an absolute value of the oscillation angle α from a horizontal line.

Figure 11:
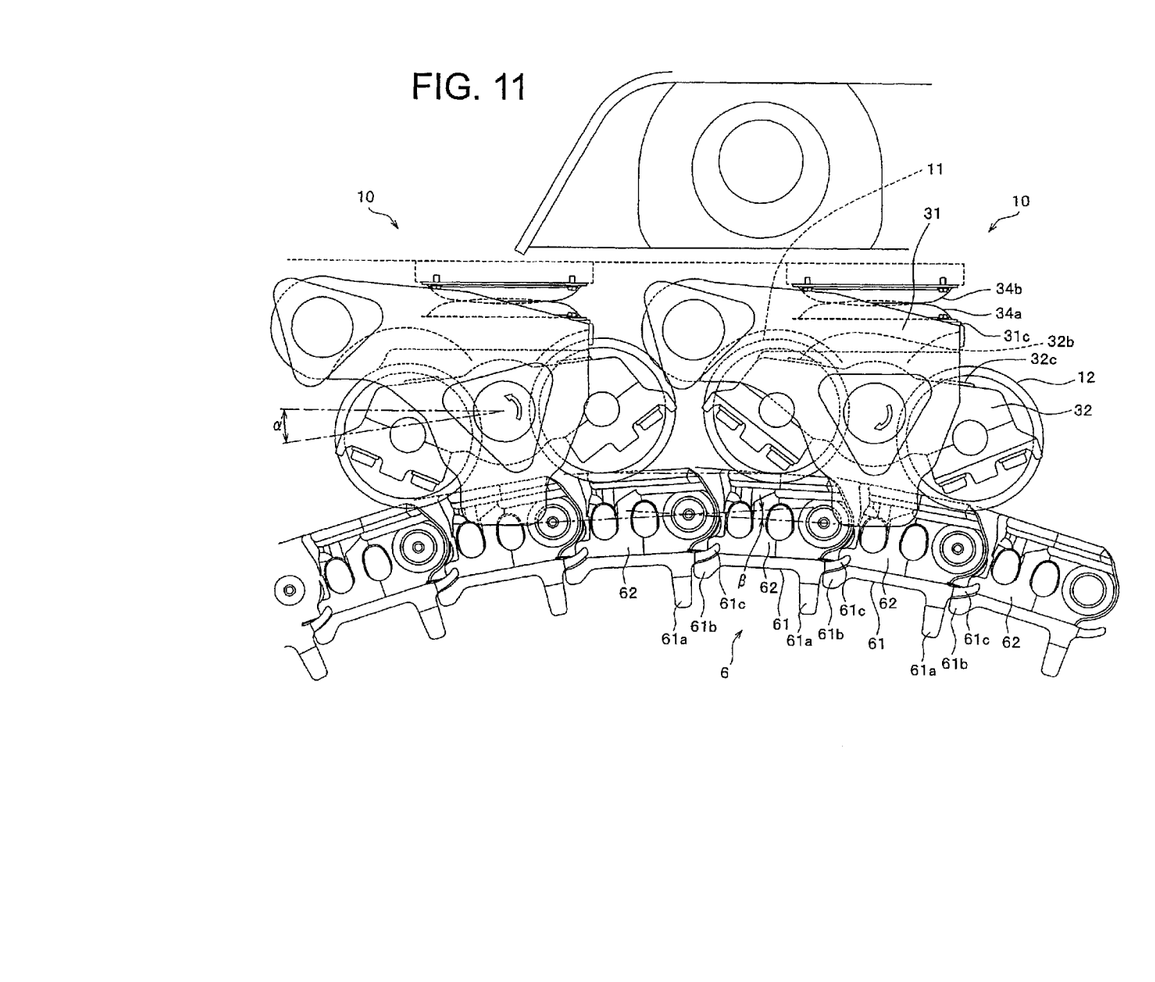
FIG. 11 is an explanatory view illustrating oscillation states of first and second lower track rollers of a double-bogie device in maximum reverse camber of a crawler.

On the other hand, as illustrated in FIG. 11, in the running device of the track-laying vehicle, the crawler 6 includes a shoe plate 61 and a connecting link 62 that is fixed to an inner surface (non-contact area) of the central portion in a width direction of the shoe plate 61 by a bolt (not illustrated). In FIG. 11, a grouser portion 61a is projected at a contact area-side rear end of the shoe plate 61, and tongue-shaped front-back wrap portions 61b and 61c are extended in the front-back direction at front-back ends of the shoe plate 61. The connecting links 62 are connected to each other by press-fitting connecting pins 63 and crawler bushes 64 in connecting holes made in front-back end portions of the connecting link 62. The connecting links 62 fixed to the shoe plates 61 are connected in an endless manner to form the crawler 6. The connected connecting links 62 can be turned about the connecting pin.

The front-back wrap portions 61b and 61c of the shoe plate 61, which are connected with the connecting link 62 interposed therebetween, overlap each other during the connection. In FIG. 11, the front wrap portion 61b is extended toward the contact area while inclined downward, and a surface opposite the contact area side is formed as a convexly curved surface. The back wrap portion 61c is extended toward the surface opposite the contact area side while inclined upward, and a surface on the contact area side is formed as a concavely curved surface. At this point, in the shoe plates 61 connected in the front-back direction, a corner portion formed between the front wrap portion 61b of the shoe plate 61 and the base end of the grouser portion 61a and a leading end of the back wrap portion 61c are relatively turned while slid on each other, and the crawler 6 becomes the reverse camber state so as to wrap the contact area when running over the raised contact area. The reverse camber angle is restricted by a crossing angle β of the connecting link 62. The crossing angle β is determined by a sliding portion shape such as a wrap angle formed between the front wrap portion 61b and the back wrap portion 61c. In other words, the crossing angle β means a maximum reverse camber angle, and usually the crossing angle β is determined in designing the crawler. In the conventional crawler, the maximum angle of the oscillation angle α of the second arm 32 is set substantially equal to the crossing angle β.

As described above, in this kind of running device including the running device for track-laying vehicle disclosed in JP-A Nos. 2001-225770 and 2005-225485, the maximum angle of the oscillation angle α of the second arm 32 is designed substantially equal to the maximum angle of the crossing angle β between the adjacent connecting links. For example, in a certain vehicle, the crossing angle β is set to 7°30' with respect to the connecting link that is of a reference, and the maximum angle of the oscillation angle α ranges within in ±8° with respect to the horizontal line. When each of the reverse camber angle and the oscillation angle α reaches the maximum angle, the crawler is not further bent, and the second arm cannot further be turned (oscillated). That is, during the running, when part of the crawler runs on the raised contact area to reach the maximum reverse camber state, and when one of the first lower track roller and the second lower track roller of the double-bogie device exists in the corresponding position, the oscillation of the second arm also reaches the maximum. When the raised contact area exists below the first lower track roller closer to the idler, the front-portion stopper of the second arm on the first-lower-track-roller supporting side comes into contact with the lower surface of the first arm, an operator is subjected to the impact stronger than that of other regions due to a high apparent spring constant. Additionally, at this point, the crawler goes straight, and the crawler is orientated obliquely upward by the track frame while the reverse camber portion on top of the raised contact area is sandwiched as a whole. Once the crawler runs over the raised surface to move the gravity of the vehicle to the front side of the raised surface, the vehicle is largely turned about the raised contact area, and the leading end of the crawler falls rapidly. Possibly the impact applied in the falling and the falling height provide an uncomfortable feeling to the operator.

SUMMARY OF THE INVENTION

In view of the foregoing, an object of the invention is to provide a running device for track-laying vehicle, in which a feeling of fear of the falling height can be resolved in a leading end portion of a crawler while the large impact is relaxed when the crawler runs over the raised contact area.

The object of the invention is effectively achieved by a basic configuration of the invention, which is a running device for track-laying vehicle including: a pair of track frames that is provided at right and left of the track-laying vehicle; an idler that is rotatably supported in one end portion of the track frame; a sprocket that is rotatably driven in a direction of the other end portion of the track frame so that the track frame, the idler, and the sprocket are provided in a substantial straight line; and a double-bogie device that includes a set of first and second front-back lower track rollers provided in a lower portion of the track frame, wherein a crawler is entrained about the idler, each of the lower track rollers, and the sprocket, the double-bogie device includes a first arm whose base end portion is supported by the track frame while freely oscillated and a second arm whose central portion is attached to a leading end portion of the first arm while freely oscillated, the first and second lower track rollers are rotatably supported by both end portions of the second arm, elastic members are provided in respective opposite surfaces of the first arm and the track frame, and a spring constant equalizing unit that equalizes an apparent spring constant of the double-bogie device over a total length in maximum reverse camber of the crawler is provided.

In the running device for track-laying vehicle according to a preferred aspect of the invention, the crawler includes a plurality of shoe plates and a plurality of connecting links each of which is fixed to the shoe plate, the connecting links are connected in an endless manner in the crawler, and the spring constant equalizing unit increases a maximum oscillation angle of the second arm in the maximum reverse camber of the crawler such that the maximum oscillation angle of the second arm is larger than a crossing angle of the connecting link. Desirably, the increased maximum oscillation angle of the second arm is 1.3 to 2.0 times the crossing angle of the connecting link in the maximum reverse camber of the crawler. Preferably, single-bogie devices are provided in front-back end portions of the track frame, and the plurality of sets of double-bogie devices are provided between the single-bogie devices of the front-back end portions.

In the conventional double-bogie device, the apparent spring constant to the vehicle body load in the position in which the first lower track roller is supported in the end portion closer to the first arm base end portion of the second arm is set extremely higher than that in other positions (second lower track roller and immediately below the second turning fulcrum) on the second arm. Therefore, when the crawler runs over the raised contact area immediately below the first lower track roller, the operator is subjected to the large impact irrespective of the existence of the elastic member, and the operator has a feeling of fear of the falling height in the leading end portion of the crawler. The double-bogie device of the invention includes the spring constant equalizing unit to evenly distribute the apparent spring constant over a total length of the second arm. Accordingly, even if the crawler runs over the raised contact area, the falling height can be reduced in the leading end portion of the crawler while the impact is relaxed, and the feeling of fear can be removed.

One of basic functions of the spring constant equalizing unit is that the maximum oscillation angle of the second arm is increased larger than the crossing angle of the connecting link in the maximum reverse camber of the crawler, so that the second arm supporting point (second turning fulcrum) of the first arm can always be subjected to the vehicle body load while the second arm does not abut on the first arm in the maximum reverse camber of the crawler. Additionally, because the second arm does not abut on the first arm, although the crossing angle of the connecting link is identical to that of the conventional one in the maximum reverse camber of the crawler, a slope angle of the track frame is relatively largely reduced by the increased oscillation angle of the second arm in the maximum reverse camber of the crawler, and thereby lowering the falling height of the leading end portion of the crawler. As a result, when the crawler runs over the raised contact area as described above, the falling height of the leading end portion of the crawler can be reduced while the impact is relaxed, and the feeling of fear of the falling height can be removed. In order to realize the effect, as described above, in at least one of the abutment surfaces of the first arm and second arm, the effect is realized by such simple forming that the abutment surface closer to the base end portion of the first arm is cut off to remove the thickness, or the bottom surface of an invasion recessed portion, which is formed closer to the base end portion of the first arm, of the first lower track roller is cut off to remove the thickness. Additionally, the effect can be obtained by cutting off at least one of the attaching surfaces of the elastic members fixed to the track frame and first arm.

When the single-bogie devices are provided in front-back end portions of the track frame while the plurality of sets of double-bogie devices are provided between the single-bogie devices of the front-back end portions, the arm of the single-bogie device and the first arm of the double-bogie device can be subjected in the dispersed way to the vehicle body load of the work track-laying vehicle through the elastic members. Therefore, because the spring constant is equalized in each lower track roller position in running not only the flat contact area but also the raised contact area, the vehicle body load of the work track-laying vehicle can substantially evenly be dispersed to maintain the good ride quality of the work track-laying vehicle.

DETAILED DESCRIPTION OF THE INVENTION

A running device for track-laying vehicle according to a preferred embodiment of the invention will be described in detail with reference to the accompanying drawings. Herein-after, a bulldozer is taken as an example of the track-laying vehicle to which the running device for track-laying vehicle of the invention is applied.

The running device of the embodiment will be described with reference to FIGS. 1 to 5. Referring to FIG. 1, a yoke 1*a* is mounted on one end portion of a track frame 1 while being movable in a longitudinal direction (front-back direction of vehicle), and a predetermined tension is applied to the yoke 1*a* with a spring (not illustrated) interposed between the yoke 1*a* and the track frame 1. An idler 2 is turnably attached to a leading end portion of the yoke 1*a*.

In the embodiment, a central portion in the longitudinal direction of the leading-end-portion arm 49 is attached to the yoke 1*a* mounted on one end portion of the track frame 1 by a pin 42 while vertically freely oscillated, the idler 2 is turnably attached to one end portion of the leading-end-portion arm 49, and a leading-end-portion lower track roller 43 is turnably attached to the other end portion of the leading-end-portion arm 49. Elastic members 44*a* and 44*b* are attached to an abutment portion between the track frame 1 and the other end portion of the leading-end-portion arm 49.

The leading-end-portion arm 49, the leading-end-portion lower track roller 43, the pin 42, and the elastic members 44*a* and 44*b* constitute a single-bogie device 40*a*. The single-bogie device 40*a* and the idler 2 form a balance structure with the leading-end-portion arm 49 interposed therebetween, and the single-bogie device 40*a* and the idler 2 are vertically oscillated. A sprocket 3 is turnably mounted on a vehicle body (not illustrated) near the other end portion of the track frame 1. A plurality of lower track rollers 11, 12, 43, and 47 are turnably attached to a lower portion of the track frame 1 between the idler 2 and the sprocket 3. A crawler 6 is entrained about the idler 2, the sprocket 3, and the plurality of lower track rollers 11, 12, 43, and 47.

The track frame 1 is supported in the front-back direction by an equalizer bar (not illustrated) and a pivot pin (not illustrated). The equalizer bar and the pivot pin are provided in the vehicle body. The pair of track frames 1 is provided at the right and left of the vehicle, and FIG. 1 illustrates one of the track frames 1. The other track frame 1 has a configuration similar to that of FIG. 1.

The front-portion single-bogie device 40*a* is provided closest to the idler 2 in the lower portion of the track frame 1. A base end portion of the leading-end-portion arm 49 of the single-bogie device 40*a* is attached to the lower portion of the track frame 1 by the pin 42 while vertically freely oscillated. The leading-end-portion lower track roller 43 is turnably attached to the leading-end lower portion of the leading-end-portion arm 49.

The pin 42 is placed closer to the idler 2 than the leading-end-portion lower track roller 43. The elastic members 44*a* and 44*b* are attached to an abutment portion between a leading-end upper surface of the leading-end-portion arm 49 and a lower surface of the track frame 1 with attaching members 44*c* and 44*d* interposed therebetween. The elastic members 44*a* and 44*b* abut on each other to restrict the upward turning of the leading-end-portion arm 49, the elastic members 44*a* and 44*b* are subjected to the load of the leading-end-portion lower track roller 43, and the elastic members 44*a* and 44*b* absorb an impact of the leading-end-portion lower track roller 43.

A single-bogie device 40*b* is provided closest to the sprocket 3 in the lower portion of the track frame 1. A base end portion of a rear-end-portion arm 45 of the rear-portion single-bogie device 40*b* is attached to the lower portion of the track frame 1 by a pin 46 while vertically freely oscillated.

The rear-end-portion lower track roller 47 is turnably attached to the leading-end lower portion of the rear-end-portion arm 45.

The pin 46 is placed closer to the idler 2 than the rear-end-portion lower track roller 47. The elastic members 48*a* and 48*b* are attached to an abutment portion between a leading-end upper surface of the rear-end-portion arm 45 and the lower surface of the track frame 1 with attaching members 48*c* and 48*d* interposed therebetween. The elastic members 48*a* and 48*b* abut on each other to restrict the upward turning of the rear-end-portion arm 45. The elastic members 48*a* and 48*b* are subjected to the load of the rear-end-portion lower track roller 47, and the elastic members 48*a* and 48*b* absorb an impact of the rear-end-portion lower track roller 47.

The plurality of sets of double-bogie devices 10 are provided in the lower portion of the track frame 1 between the leading-end-portion lower track roller 43 on the side of the idler 2 and the rear-end-portion lower track roller 47 on the side of the sprocket 3. In FIG. 1, the three sets of double-bogie devices 10 are provided by way of example. The number of sets of double-bogie devices 10 is not limited to three. FIG. 2 is a side view illustrating the detailed double-bogie device 10 of the embodiment. In FIG. 2, portions indicated by a solid line and a hidden outline (broken line) express a characteristic structure of the embodiment, and a portion indicated by a phantom line (alternate long and two short dashes line) expresses a conventional general structure. As used herein, the double-bogie device means a device that attaches the plurality of lower track rollers to the track frame while the lower track rollers are freely oscillated.

In FIG. 2, a base end portion of a first arm 31 is attached to the lower portion of the track frame 1 by a first pin 33 (first turning fulcrum) while vertically freely oscillated. A second pin 35 is provided in a leading end portion of the first arm 31, and the second pin 35 is inserted in a substantially central bearing portion of a second arm 32. The second arm 32 is attached while vertically freely oscillated about the second pin 35 (second turning fulcrum). The first and second lower track rollers 11 and 12 are turnably attached to both end portions of the second arm 32, respectively. The first pin 33 is provided closer to the idler 2 than the second pin 35.

Elastic members 34*a* and 34*b* are attached to an abutment portion between a leading-end upper surface of the first arm 31 and the lower surface of the track frame 1 with attaching members 34*c* and 34*d* interposed therebetween. The elastic members 34*a* and 34*b* abut on each other to restrict the upward turning of the first arm 31. The elastic members 34*a* and 34*b* are subjected to the load of the first and second lower track rollers 11 and 12, and the elastic members 34*a* and 34*b* absorb impacts of the first and second lower track rollers 11 and 12. When the vehicle runs on or runs over the raised portion, the elastic members 34*a* and 34*b* absorb the impacts of the first and second lower track roller 11 and 12. The elastic members 34*a*, 34*b*, 48*a*, and 48*b* are made of high-hardness natural rubber or urethane rubber.

Stopper portions 32*b* and 32*c* project in front-back upper surfaces located across the second pin 35 of the second arm 32 from each other. The stopper portions 32*b* and 32*c* are formed by raised portion that abut on the lower surface of the first arm 31 at an oscillation limit of the second arm 32. Conventionally, a maximum oscillation angle of the second arm 32, which becomes the oscillation limit at that time, is set to ±8° with respect to a horizontal line. On the other hand, in the embodiment, the maximum oscillation angle of the second arm 32 ranges from ±10° to ±15° with respect to the horizontal line. At this point, a value of a crossing angle β between the connecting links in a maximum reverse camber of the crawler 6 becomes 7°30'.

Figure 3:
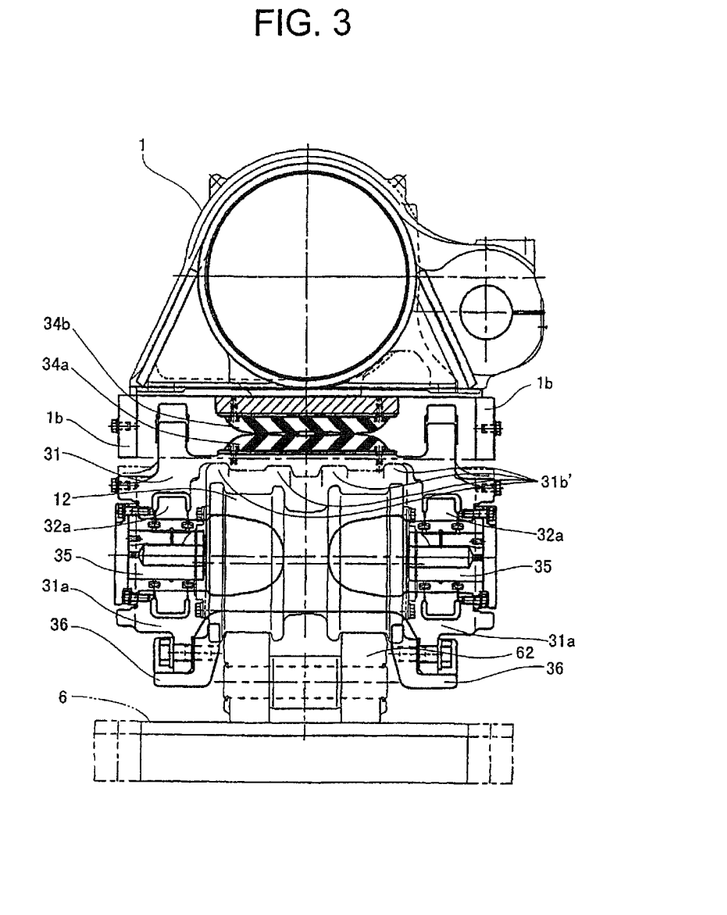
FIG. 3 is a sectional view taken on a line of FIG. 1.
Figure 4:
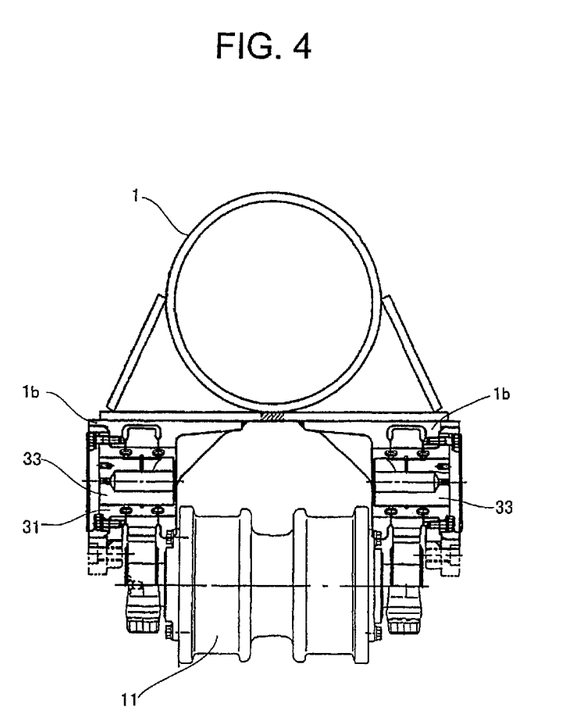
FIG. 4 is a sectional view taken on a line IV-IV of FIG. 1.
Figure 5:
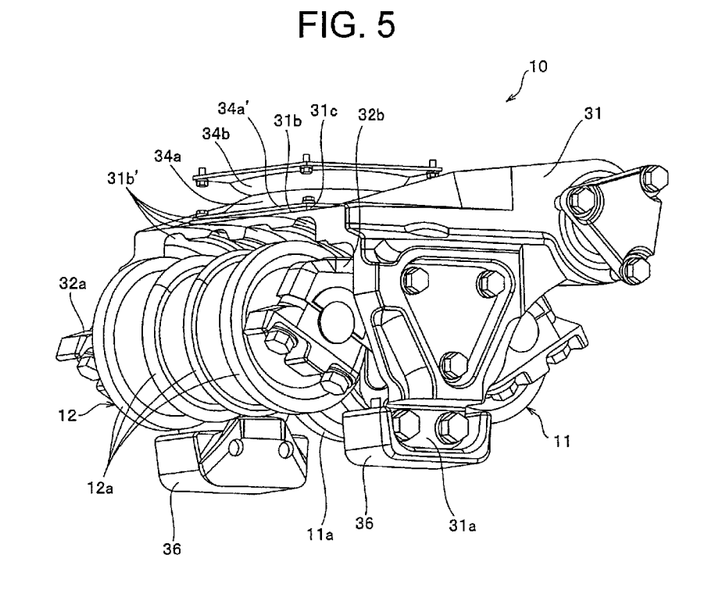
FIG. 5 is a cubic diagram of the double-bogie device when viewed from a backward and obliquely downward direction.

FIGS. 3 to 5 illustrate a specific configuration of the double-bogie device 10. The configuration of the double-bogie device 10 will be described in detail. A pair of plates 1*b* and 1*b* extending downward is provided in the lower portion of the track frame 1 and in right and left end portions in a vehicle width direction. A base end portion of the first arm 31 is attached between the pair of plates by the pair of right and left first pins 33 and 33 (first turning fulcrum) while freely oscillated. A leading end portion of the first arm 31 is formed into an inverted U-shape in which a section in the right and left direction is opened downward. A pair of right and left support portions 31*a* and 31*a* extending downward is provided in right and left end portions of inverted U-shape upper-end flat plate portions 31*b*. In the lower surface of the upper-end flat plate portion 31*b*, as illustrated in FIGS. 4 and 5, a plurality of recessed portions 31*b*' are formed in parallel with an arm length direction, and flange portions 11*a* and 12*a* of the first and second lower track rollers 11 and 12 invade into the recessed portions 31*b*' during the oscillation of the second arm 32.

Similarly, the second arm 32 includes a pair of right and left arm members 32*a* and 32*a*. An attaching seat portion 31*c* of the elastic member 34*a* is raised in the center of the leading-end-portion upper surface of the upper-end flat plate portion 31*b* between the pair of right and left support portions 31*a* and 31*a* of the first arm 31. The elastic member 34*a* is fixed to the attaching seat portion 31*c* with a washer 34*a*' interposed therebetween. The pair of right and left arm members 32*a* and 32*a* is inserted between the pair of right and left support portion 31*a* and 31*a*, and substantially central portions of the pair of right and left arm members 32*a* and 32*a* are attached by the second pins 35 and 35 (second turning fulcrum). The lower track rollers 11 and 12 are turnably attached between both leading end portions of the second arm 32 and between the pair of right and left arm members 32*a* and 32*a*.

Brackets 36 and 36 each of which has a substantially L-shape in section are attached to the inside of lower end portions of the pair of right and left support portions 31*a* and 31*a* such that one of the L-shape members is orientated upward while the other member is orientated outward. The upward members of the pair of right and left brackets 36 and 36 have tapered surfaces in surfaces opposite each other, and the tapered surfaces abut on connecting links 62 provided right and left of the inner circumferential side of the crawler 6. The tapered surfaces of the pair of right and left brackets 36 and 36 abut on the connecting links 62 to control the deviation of the crawler 6 in the right and left direction.

In the embodiment, because the structure of the crawler 6 is substantially identical to the conventional crawler structure of FIG. 11, the specific description is omitted.

Figure 6A:
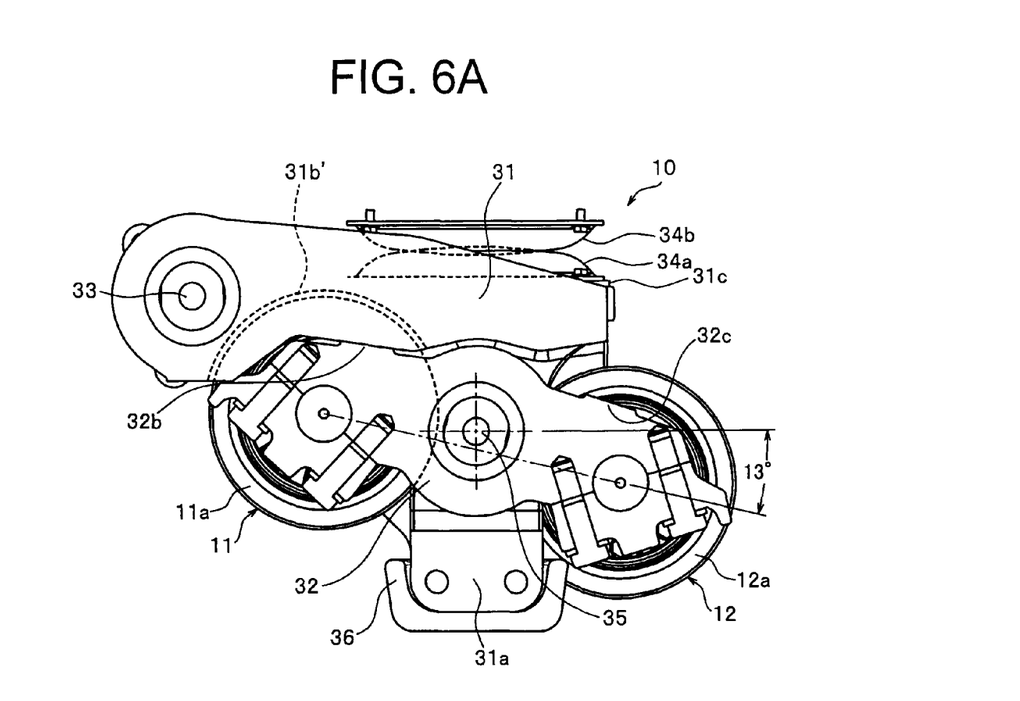
FIGS. 6A and 6B are explanatory views illustrating comparison of the embodiment of the invention and a conventional example in a state where the double-bogie device runs on a raised contact area in forward running.
Figure 6B:
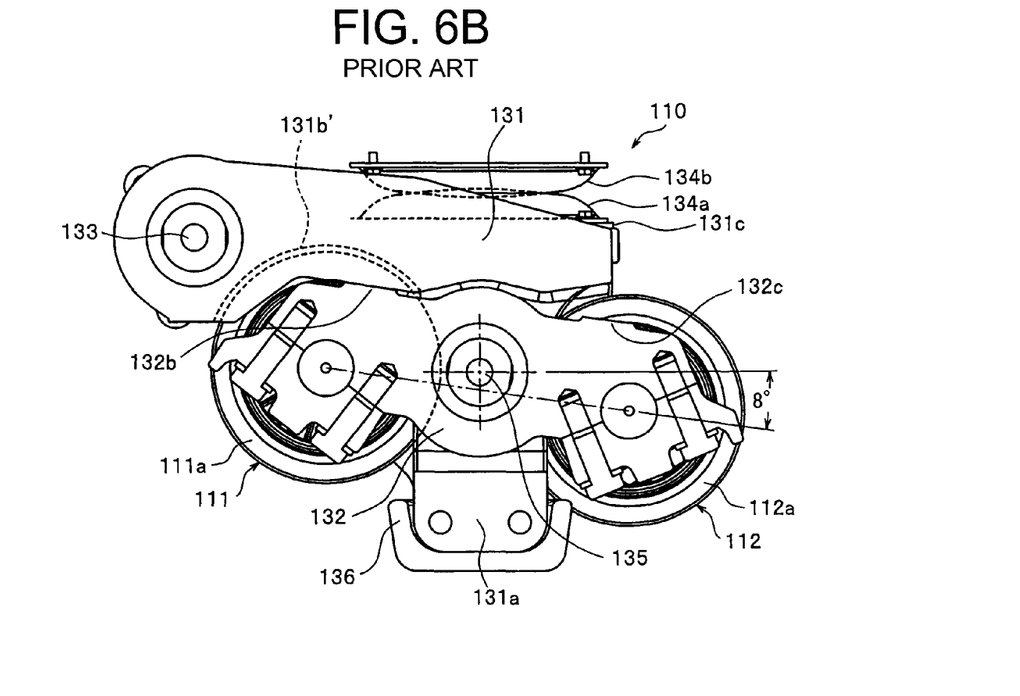
Figure 7A:
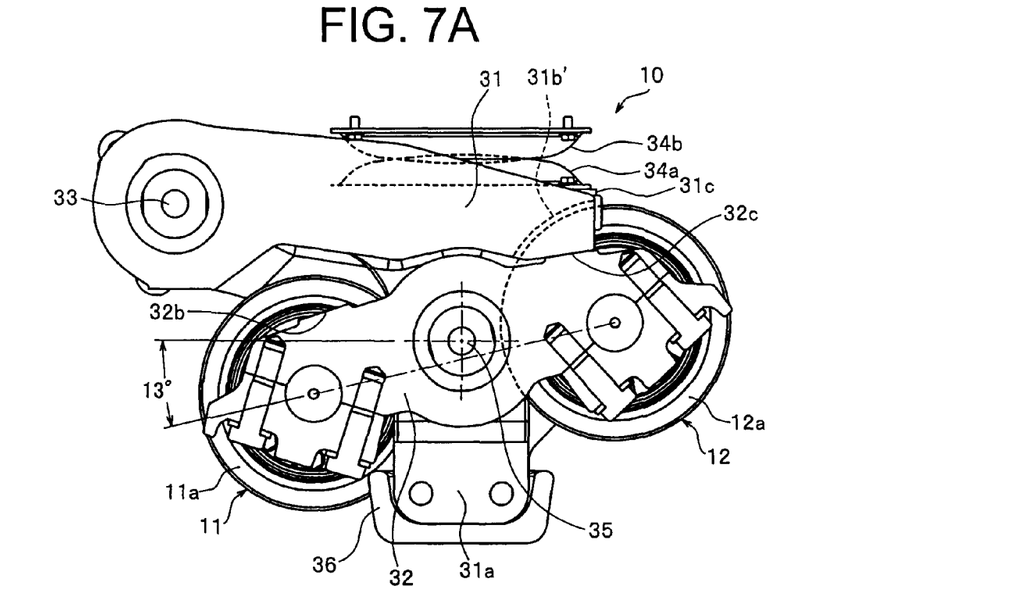
FIGS. 7A and 7B are explanatory views illustrating comparison of the embodiment of the invention and a conventional example in a state where the double-bogie device runs on the raised contact area in backward running.
Figure 7B:
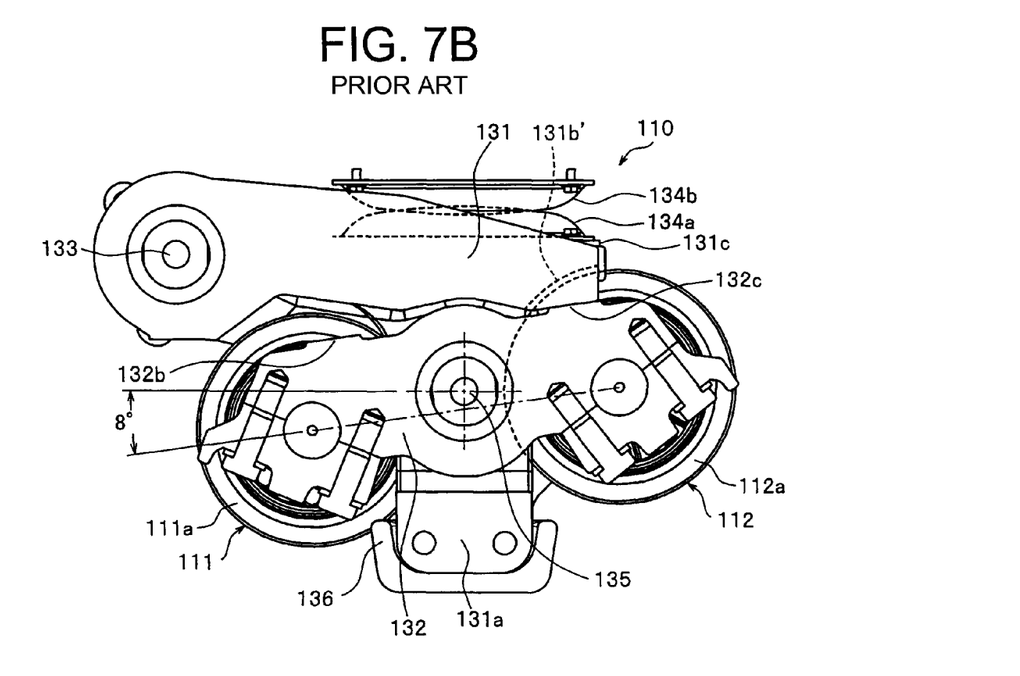

Although the entire structure of the double-bogie device of the invention is similar to that of the conventional structure indicated by the phantom line of FIG. 2, the double-bogie device 10 of the embodiment differs from that of the conventional structure in the following points (I) to (III) as illustrated in FIGS. 6A, 6B, 7A and 7B. FIGS. 6A and 6B illustrate attitudes of the double-bogie device 10 of the embodiment and the conventional double-bogie device 110 when the running devices run on the raised contact area in forward running. FIGS. 7A and 7B illustrate attitudes of the double-bogie device 10 of the embodiment and the conventional double-bogie device 110 when the running devices run on the raised contact area in backward running.

In the embodiment, as illustrated by the solid line of FIG. 2 and FIGS. 6 and 7, (I) the upper surface portion of the second arm 32 except for the central bearing portion is cut off to remove a required thickness, thereby obtaining the maximum oscillation angle of ±13° of the second arm 32 abutting on the first arm 31 with respect to the horizontal line. The maximum oscillation angle of ±13° is increased by 5° compared with the conventional maximum oscillation angle of ±8°. As illustrated by the hidden outline (broken line) of FIGS. 6 and 7, (II) a bottom surface of the recessed portion 31*b*' formed in the first arm 31 is cutoff to remove a required thickness, and the bottom surface is deepened to increase an invasion amount in the oscillation direction of the first and second lower track rollers 11 and 12 with respect to the recessed portion 31*b*', thereby increasing the maximum oscillation angle of the second arm 32 with respect to the horizontal line by 5° compared with the conventional maximum oscillation angle. As illustrated by the solid line of FIG. 8, (III) a seat surface of the attaching seat portion 31*c* in the leading-end-portion upper surface of the first arm 31 is cut off to remove a required thickness, thereby increasing the oscillation angle of the first arm 31 compared with the conventional oscillation angle.

Figure 8:
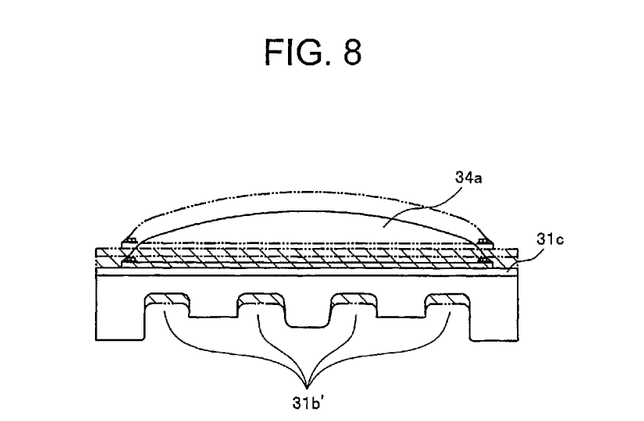
FIG. 8 is a front view illustrating a modification of a structure of an elastic member attaching portion of a first arm and an inner surface recessed portion of the embodiment.

Referring to FIGS. 6 to 8, the action and effect of a running device for work track-laying vehicle on which the double-bogie device 10 of the embodiment will be described while the double-bogie device 10 of the embodiment is compared with the conventional double-bogie device 110. FIGS. 6A and 7A illustrate the attitude of the double-bogie device of the embodiment, and FIGS. 6B and 7B illustrate the attitude of the conventional double-bogie device.

FIG. 2 illustrates the attitude of the double-bogie device 10 when the running device runs on the flat contact area. When the running device runs on the flat contact area, because the even load are applied to the pair of first and second lower track rollers 11 and 12 in the front-back direction of the second arm 32, the second arm 32 is not oscillated while a balance is established around the second pin 35 (second turning fulcrum) that is of the fulcrum of the second arm 32. Therefore, there is no difference between the double-bogie device of the embodiment and the conventional double-bogie device, the first and second lower track rollers are equally subjected to the vehicle load, and the elastic members 34*a* and 34*b* fixed to the first arm 31 and track frame 1 are elastically subjected to the vehicle load, thereby absorbing the vibration to maintain the stable running.

FIG. 6 illustrates the attitude of the double-bogie device 10 when the running device runs on the raised contact area in forward running. In the double-bogie device 10 of the embodiment of FIG. 6A, as described above, the bottom surface of the recessed portion 31*b*' of the first arm 31 is cut off to remove the required thickness, the bottom surface is deepened, the upper surface portion of the second arm 32 except for the central bearing portion is cut off to remove the required thickness, thereby obtaining the maximum oscillation angle of ±13° of the second arm 32 abutting on the first arm 31 with respect to the horizontal line. The maximum oscillation angle of ±13° is increased 1.7 times the conventional maximum oscillation angle. As a result, even if the crawler 6 runs on the raised contact area to become the maximum reverse camber state, the oscillation is continued while the second arm 32 does not abut on the first arm 31 after the reverse camber angle of the connecting link 62 reaches 7°30' that is of the crossing angle β. Therefore, at that time, the vehicle load is applied to the oscillation center (second turning fulcrum) of the second arm 31. The impact is relaxed by elastic compression of the elastic members 34*a* and 34*b* that are fixed to the leading end portion of the first arm 31 and the lower surface of the track frame 1. At this point, an apparent spring constant of the second arm 32 is identical to that in running on the flat contact area (FIG. 10C), the operator feels tenderness of the elasticity of the elastic members 34a and 34b, and the operator does not generate uncomfortable feeling on the ride quality. The same holds true for the case in which the running device rides on the raised contact area in backward running as illustrated in FIG. 7.

As described above, the abutment of the upper surface of the second arm 32 on the lower surface of the first arm 31 is delayed by increasing the maximum oscillation angle of the second arm 32, and the attitude of the track frame 1 is kept in a substantially horizontal position until the upper surface of the second arm 32 abuts on the lower surface of the first arm 31. A frequency of the phenomenon, in which the nose height of the running device is increased by the upward slope, is significantly lessened to release the uncomfortable feeling with the nose falling that is generated when the gravity center of the vehicle runs over the raised contact area after passing through the crest of the raised contact area. The setting of the increased maximum oscillation angle of the second arm 32 may be determined in consideration of a replacement time of front-back-direction wrap portions 61a and 61b (see FIG. 11) of a shoe plate 61 of the crawler 6.

On the other hand, soon after the running device equipped with the conventional double-bogie device 110 of FIG. 6B runs on the raised contact area in forward running to reach the maximum reverse camber state (crossing angle of 7°30') that is of a wrap-around limit of the crawler 6, a stopper portion 132b that is of an upper-surface raised portion of a second arm 132 abuts on a lower surface of a first arm 131, and the vehicle load is applied onto the abutment surface. At this point, a length L1 from an oscillation fulcrum (first turning fulcrum) of the first arm 131 to a stopper portion 132b that is of a raised portion in front of the second arm 132 is shorter than lengths L2 and L3 from the oscillation fulcrum of the first arm 131 to other support positions (second turning fulcrum and stopper portion 132c). Therefore, the apparent spring constant is largely increased compared with other support positions. Particularly, when the running device runs over the raised contact area in forward running, cushioning effects of elastic members 134a and 134b is lowered to provide a rugged feeling to the operator, and the impact is increased at the moment at which the upper-surface raised portion that is of the stopper portion of the second arm 132 abuts on the lower surface of the first arm 131. The spring constants at a first lower track roller 111 and second lower track roller 112 are spring constants after the stopper portions 132b and 132c of the second arm 132 abut on the first arm 131.

In other words, the double-bogie device is regarded as a ladder in which the first turning fulcrum is set to the fulcrum while the abutment portion of the elastic member is set to the action point. In the conventional double-bogie device 110, depending on the position (position in which the crawler comes into contact with the ground) onto which the load is applied in the crawler below the second arm, the power point is moved to three points, that is, the abutment portion between the stopper portion 132b and the first arm 131, the second turning fulcrum, and the abutment portion between the stopper portion 132c and the first arm 131. The spring constant is kept constant at the action point, and the length from the fulcrum to the power point is lengthened in this order. Therefore, the spring constant at each power point is decreased in this order. On the other hand, in the double-bogie device 10 of the embodiment, because the power point is fixed to the second turning fulcrum irrespective of the position onto which the load is applied, the spring constant is kept substantially constant.

In the conventional double-bogie device 110, even after the stopper portion 132b that is of the upper-surface raised portion of the second arm 132 abuts on the lower surface of the first arm 131, the second arm 132 continuously presses the lower surface of the first arm 131 in order to continue the oscillation and, eventually, the second arm 132 lifts the track frame 1. Therefore, the upward slope angle is increased in the forward direction of the track frame 1, the nose height that falls at the moment at which the running device runs over the crest of the raised contact area is also increased, and the feeling of fear for the falling and the impact generated in the falling are also increased.

In the embodiment, as illustrated in FIG. 8, in addition to the above-described improvement, the seat surface of the attaching seat portion 31c in the leading-end-portion upper surface of the first arm 31 is cut off to remove the required thickness, and whereby the oscillation angle of the first arm 31 is increased compared with the conventional double-bogie device 110. In the thickness removing portion of the attaching seat portion 31c of the embodiment, the thickness of 9 mm is removed in the attaching seat portion having the thickness of 20 mm.

As described above, according to the invention, the spring constant is equalized over the total length of the second arm of the double-bogie device. Therefore, for example, when the running device runs over the raised contact area, the uncomfortable feeling with the nose falling height can be reduced while the cushioning effect of the elastic member is largely improved.

The application of the double-bogie device 10 of the invention is not limited to the track-laying vehicle. For example, the invention can be applied to various track-laying vehicles in addition to the bulldozer disclosed in JP-A No. 2001-225770.

What is claimed is:

1. A running device for a track-laying vehicle comprising:
    a pair of track frames disposed at right and left regions of the track-laying vehicle;
    an idler rotatably supported in one end portion of the track frame;
    a sprocket disposed at the other end portion of the track frame, the track frame, the idler, and the sprocket being arranged substantially along a straight line, wherein the sprocket is configured to be rotatably driven;
    a double-bogie device comprising:
        first and second lower track rollers disposed in a lower portion of the track frame along a running direction of the vehicle,
        a first arm having a base end portion that is pivotally supported by the track frame at a first fulcrum of the first arm, the first arm being configured to swing about the first fulcrum in a vertical direction,
        a second arm having a central portion that is pivotally attached to a leading end portion of the first arm at a second fulcrum, the second arm being configured to swing vertically back and forth about the second fulcrum to a maximum oscillation angle in either direction, wherein the first and second lower track rollers are rotatably supported by both end portions of the second arm, the second arm further having a stopper portion that abuts the first arm when the second arm is at the maximum oscillation angle, and
        elastic members positioned on respective opposite surfaces of the first arm and the track frame; and a crawler entrained about the idler, each of the lower track rollers, and the sprocket, the crawler comprising shoe plates and connecting links fixed to the shoe plates, the connecting links being pivotally connected to each other to form an endless link chain, wherein adjacent connecting links of the crawler pivot to a maximum crossing angle, wherein the maximum oscillation angle is greater than the maximum crossing angle, and wherein a spring constant of the double-bogie device when the crawler is at a maximum reverse camber is substantially equal to a spring constant of the double-bogie device when the crawler is at a flat state.

2. The running device according to claim 1, wherein the maximum oscillation angle of the second arm is 1.3 to 2.0 times the maximum crossing angle.

3. The running device according to claim 1, wherein the maximum oscillation angle of the second arm ranges from 10 to 15°.

4. The running device according to claim 1, further comprising single-bogie devices disposed in front and rear end portions of the track frame along the running direction of the vehicle, wherein one or more double-bogie devices are positioned between the single-bogie devices in the front and rear end portions.

5. The running device according to claim 2, wherein a spring constant of the double-bogie device is substantially identical over a total length of the second arm.

* * * * *